US011245696B2

(12) United States Patent
Kurahashi (10) Patent No.: US 11,245,696 B2
(45) Date of Patent: Feb. 8, 2022

(54) DEVICE MANAGEMENT SYSTEM AND DEVICE MANAGEMENT METHOD

(71) Applicant: CANON KABUSHIKI KAISHA, Tokyo (JP)

(72) Inventor: Yuichi Kurahashi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 150 days.

(21) Appl. No.: 16/693,513

(22) Filed: Nov. 25, 2019

(65) Prior Publication Data

US 2020/0195640 A1 Jun. 18, 2020

(30) Foreign Application Priority Data

Dec. 14, 2018 (JP) .............................. JP2018-234203

(51) Int. Cl.
*H04L 29/06* (2006.01)
*G06F 21/45* (2013.01)

(52) U.S. Cl.
CPC .......... *H04L 63/0876* (2013.01); *G06F 21/45* (2013.01); *H04L 63/083* (2013.01)

(58) Field of Classification Search
CPC .... H04L 63/0876; H04L 63/083; G06F 21/45
See application file for complete search history.

(56) References Cited

U.S. PATENT DOCUMENTS

| | | | | |
|---|---|---|---|---|
| 6,345,184 B1* | 2/2002 | van der Salm | ....... | H04W 84/14 455/432.2 |
| 7,633,915 B1* | 12/2009 | Lewis | .................. | H04W 60/04 370/338 |
| 9,124,843 B2 | 9/2015 | Kato | | |
| 2007/0121869 A1* | 5/2007 | Gorti | ....................... | H04L 65/80 379/201.02 |
| 2007/0280138 A1* | 12/2007 | Stern | .................... | H04W 72/005 370/254 |
| 2009/0157799 A1* | 6/2009 | Sukumaran | ........... | H04L 67/306 709/203 |
| 2012/0221603 A1* | 8/2012 | Kothule | ................ | G06F 16/256 707/783 |
| 2016/0117263 A1* | 4/2016 | Kanno | .................. | H04L 63/061 713/171 |
| 2018/0206100 A1* | 7/2018 | Eisner | ................... | G06F 16/284 |
| 2019/0165960 A1* | 5/2019 | Rese | .................... | H04L 12/1886 |

FOREIGN PATENT DOCUMENTS

JP 2014081779 A 5/2014

* cited by examiner

*Primary Examiner* — Tongoc Tran (74) *Attorney, Agent, or Firm* — Rossi, Kimms & McDowell LLP (57) ABSTRACT

A device management system according to the present invention issues a register key that specifies a worker tenant, receives a registration request including the register key from a network device, and transmits first authentication information to the network device. The first authentication information is registered in the worker tenant that is specified by the register key of the registration request. If there has been communication that uses the first authentication information from the network device after the tenant is created, the information about the network device registered in the worker tenant is automatically changed to be registered in the different tenant.

8 Claims, 9 Drawing Sheets

```
800
┌─────────────────────────────────────────────────────────┐
│ PRIOR REGISTRATION OF NETWORK DEVICE                    │
├─────────────────────────────────────────────────────────┤
│ SALES ORGANIZATION A (TENANT ID: 10001)                 │
│                                                         │
│   SPECIFY AND REGISTER IN ADVANCE THE MOVEMENT DESTINATION
│   CUSTOMER ORGANIZATION TENANT FOR THE NETWORK DEVICE TO
│   BE REGISTERED IN THE TENANT OF THE SALES ORGANIZATION │
│                                                         │
│   SERIAL NUMBER:         [ DEV00003 ]  ~801             │
│                                                         │
│   MOVEMENT DESTINATION   [ 20001 ]     ~802             │
│   CUSTOMER TENANT ID:                                   │
│                                                         │
│   CUSTOMER NAME OF       X COMPANY                      │
│   MOVEMENT DESTINATION:                                 │
│                                                         │
│                              [ REGISTER ]  ~803         │
└─────────────────────────────────────────────────────────┘
```

FIG. 9

DEVICE MANAGEMENT SYSTEM AND DEVICE MANAGEMENT METHOD

BACKGROUND OF THE INVENTION

Field of the Invention

The present invention relates to a technique that registers a network device in a device management server in association with information about a customer user.

Description of the Related Art

With the spread of cloud services and IoT (Internet of Things), there has been known a system in which a network device such as an image forming apparatus is communicatively connected to a device management server and managed by this device management server. In such a system, many network devices can be registered for each customer in one device management server.

Typically, the device management server classifies and manages many network devices for each customer. For example, in the third Embodiment of Japanese Unexamined Patent Application, First Publication No. 2014-81779, when registering a network device in a device management server, individual identification information that specifies the network device is registered in association with a register key that specifies the customer. Accordingly, the network devices can be managed for each customer.

The work for registering the network device in the device management server is typically performed at a site where the network device is installed. In the system of Japanese Unexamined Patent Application, First Publication No. 2014-81779, when an installation worker accesses a device management server by using a communication terminal such as a smartphone and specifies a customer, a device registration code is issued from the device management server and returned. Subsequently, the installation worker operates the installed network device and thereby the installed network device transmits this device registration code to the device management server, and then the network device is registered in the device management server.

Therefore, in the system of Japanese Unexamined Patent Application, First Publication No. 2014-81779, if a device management service for a new customer starts, it is necessary to register the customer in the device management server in advance before the installation work of the network device and to obtain a customer registration code.

Additionally, in many cases, the installation work of the network device is performed by, for example, a company that has sold the network device, rather than by a customer. Accordingly, the installation worker is required to obtain and store many customer registration codes, bring the corresponding registration codes to the installation site, and input the registration codes correctly into the network devices.

For this reason, the work for registering the network device in the device management server has been a cause of increasing a load on the installation work and the like.

SUMMARY OF THE INVENTION

The present invention reduces a load on a work for registering a network device in a device management apparatus.

In order to solve the above inconvenience, the present invention provides a device management system including a device management service that classifies and manages network devices for each tenant comprising: a memory storing instructions; and a processor executing the instructions causing the manager to: issue a register key that specifies a worker tenant; receive a registration request including the register key from the network device; transmit first authentication information issued for use in communication with the device management system to the network device, which is a transmission source of the registration request; register information about the network device, which is the transmission source of the registration request in the worker tenant that is specified by the register key included in the registration request; and automatically re-register the information about the network device that has been registered in the worker tenant with a different tenant if there has been communication that uses the first authentication information from the network device after the different tenant for managing the information about the network device, which is the transmission source of the registration request, is created.

In the present invention, when registering the network device in the device management server, a register key that specifies a worker tenant is used, and after registration, a tenant to whom the network device belongs is re-registered from a worker tenant to a user tenant. Therefore, according to the present invention, it is possible to reduce a load of the work for operating the network device to register the network device in the device management apparatus.

Further features of the present invention will become apparent from the following description of exemplary embodiments with reference to the attached drawings.

DESCRIPTION OF THE EMBODIMENTS

Hereinafter, the best mode for carrying out the present invention will be described with reference to the drawings.

Embodiment 1

Figure 1:
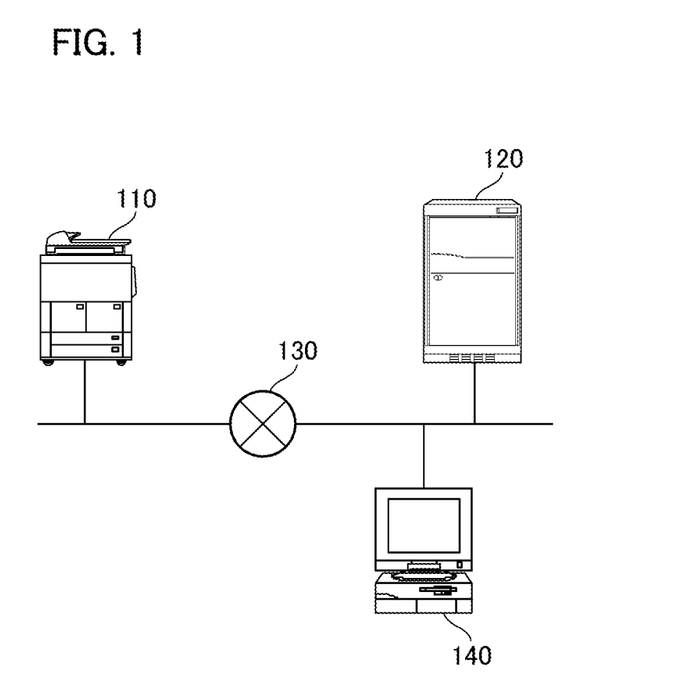
FIG. 1 is a conceptual diagram illustrating the overall configuration of a device management system according to each embodiment of the present invention.

FIG. 1 illustrates a system configuration according to Embodiment 1 of the present invention.

As shown in FIG. 1, a network device management system of the present embodiment is configured by a network device 110, a device management server 120, a network 130, and a client terminal 140.

The network device 110 is connected to the device management server 120 via the network 130 such as the Internet. This network device 110 is a processing device installed and used in a network of a customer organization, which is, for example, an image processing apparatus such as a printer, a copying machine, and a scanner. Here, the "customer organization" is, for example, a company that actually uses the network device 110.

Although only one network device 110 is shown in FIG. 1, a plurality of network devices 110 may exist in a network of single customer organization. Additionally, a plurality of the network devices 110 of a plurality of customer organizations may be connected to the single device management server 120.

A server connection application (not illustrated) is installed in the network device 110. The network device 110 is connected to the device management server 120 by this server connection application during the transmission of, for example, the setting information and the operation information.

Upon connection of the network device 110 to the device management server 120, the network device 110 first acquires access permission information such as an access token and a session ID by executing the authentication processing of the device management server 120. Subsequently, the network device 110 attaches the acquired access permission information to the setting information and the operation information (that is, the information for entrusting the management to the device management server 120) when transmitting the setting information and the operation information to the device management server 120.

The device management server 120 receives and manages, for example, the setting information and the operation information from the authenticated network device 110 on the cloud. The device management server 120 is configured to specify an owner of the network device 110 when the network device 110 is connected. For this purpose, the device management server 120 performs the registration processing of the network device 110 in advance. The device management server 120 according to the present embodiment manages the network device 110 in a state in which the network device 110 is logically separated for each tenant (to be described below) to which the network device belongs.

Additionally, when the device management server 120 receives a notification from the network device 110 that the setting information, the operation information, and the like are to be transmitted, the device management server 120 performs the authentication processing of the network device 110 based on the registration information and issues the access permission information. Subsequently, the device management server 120 waits for the receipt of the setting information and the operation information from the network device 110.

The client terminal 140 is a communication terminal directly operated by an operator of a sales organization. A Web browser is installed in the client terminal 140. Here, the "sales organization" is an organization that sells the network device 110 to a customer organization, installs the network device 110, and performs a management service.

Figure 2:
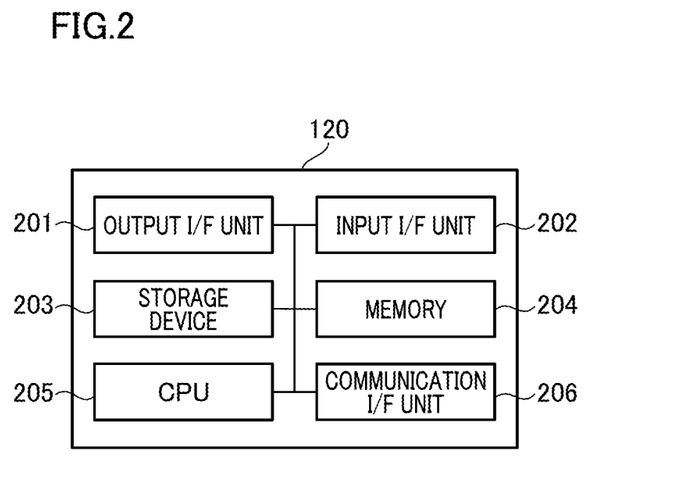
FIG. 2 is a block diagram illustrating an example of a hardware configuration of the device management server according to each embodiment.

FIG. 2 illustrates a hardware configuration of a server computer that implements the device management server 120 according to the embodiment of the present invention.

In this server computer, an output I/F unit 201 is connected to an output device such as a display.

An input I/F unit 202 is connected to an input device such as a keyboard.

A storage device 203 stores an OS (Operating System), an authentication program, a management program, the registration information of the customer organization and a network device 110, and the setting information and the operation information and the like received from the network device 110. Here, the authentication program is a program that performs the authentication and connection processing. Additionally, the management program is a program that registers and manages the network device 110.

A CPU 205 loads the authentication program and the management program from the storage device 203 into a memory 204 and executes the authentication program and the management program.

A communication I/F unit 206 is a network interface for controlling the communication of the network device 110 via the network 130.

Note that the drawing illustrating the hardware configuration shown in FIG. 2 corresponds to a hardware block diagram of a typical information processing apparatus, and is also applied to the network device 110 and the client terminal 140 of the present embodiment. Accordingly, the hardware configuration of the network device 110 has the same configuration as the configuration shown in FIG. 2.

Figure 3:
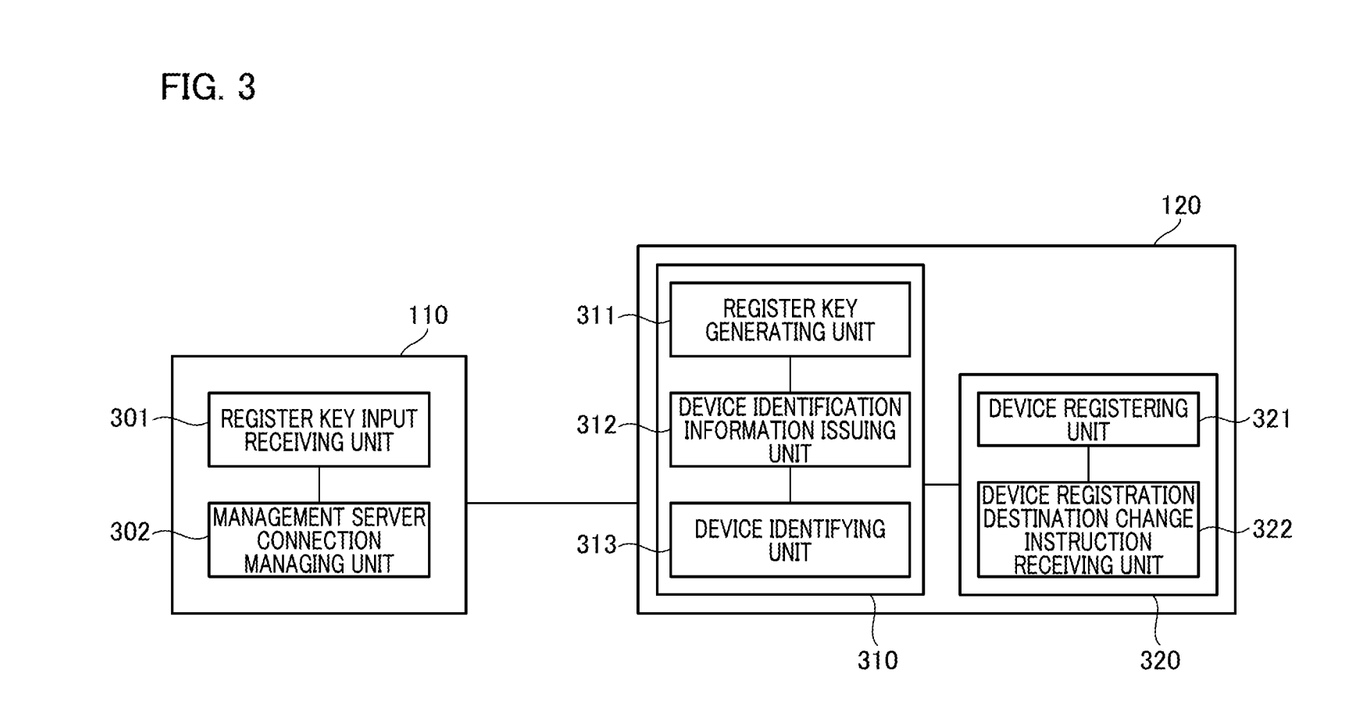
FIG. 3 is a block diagram illustrating an example of a software configuration of the main parts of a network device and a device management server according to each embodiment.

FIG. 3 is a block diagram illustrating main parts of the network device 110 and the device management server 120 (components related to the present embodiment).

The data of the network device 110 is managed by the device management server 120 in a state in which the data is logically separated by each customer organization and each sales organization. Hence, in the device management server 120, a "tenant", which is a virtual organization, is created in units of the customer organization and the sales organization, and assigned to the customer organization or the sales organization. Subsequently, the data of the network devices 110 can be managed separately in tenant units by registering the network devices 110 in advance for each tenant assigned to the customer organization or the sales organization. In the description below, the tenant of the sales organization corresponds to the "worker tenant" of the present invention, and the tenant of the customer organization corresponds to the "user tenant" of the present invention.

As shown in FIG. 3, the network device 110 includes a register key input receiving unit 301 and a management server connection managing unit 302.

The register key input receiving unit 301 receives an input of a register key for specifying a tenant to which the network device 110 belongs. The register key can be input by operating, for example, a hardware key and a touch panel provided on the network device 110. Additionally, the register key may be input by an OCR (Optical Character Recognition) or a two-dimensional bar code reader by using the input I/F.

The management server connection managing unit 302 registers the network device 110 in the device management server 120 by using the registration code. The registration code is input by using the register key input receiving unit 301. The network device 110 can acquire the device identification information by being registered in the device management server 120. The network device 110 can establish a connection with the device management server 120 by using this device identification information.

The device management server 120 includes a device connection management unit 310 configured by software by an authentication program, and a device registration management unit 320 configured by software by the management program. As described above, the authentication program and the management program are stored in the storage device 203 (see FIG. 2).

The device connection management unit 310 manages identification information that identifies the network device 110 and performs authentication processing (to be described below). This device connection management unit 310 includes a register key generating unit 311, a device identification information issuing unit 312, and a device identifying unit 313.

The register key generating unit 311 generates a register key for uniquely specifying a tenant. The register key is used by the network device 110 to register a dependent tenant. The generated register keys are respectively recorded in the register key management table.

Table A shows an example of the register key management table.

TABLE A

| Tenant ID | Register key | Expiration date |
|---|---|---|
| 10001 | 12345678 | 2019 Apr. 1 0:00 |
| 10001 | 23456789 | 2019 Jul. 1 0:00 |
| 10002 | 34567890 | 2019 May 1 0:00 |

In Table A, the "Tenant ID" is ID information for uniquely identifying a tenant assigned to the customer organization or the sales organization.

The "Register key" is generated so as to be unique in the device management server 120, where one or a plurality of "register keys" are generated for one tenant ID. The register key is generated when the tenant is created or in response to a request from a user who belongs to the tenant.

The "Expiration date" is expiration date of the register key. Setting of the expiration date is not mandatory.

Since the register key is unique in the device management server 120, the tenant ID can be identified based on the register key. As a result, the register key can be used to identify the tenant to which the network device 110 belongs.

The device identification information issuing unit 312 issues a device ID that uniquely identifies the network device 110 for each tenant. The present embodiment describes an example in which the device ID is used as the authentication information that is required for accessing the device management server 120. The device identification information issuing unit 312 may also issue an authentication key that is required for accessing the device management server 120 in addition to the device ID, to serve as the authentication information.

Typically, the network device 110 has a serial number for identifying the device. However, the serial number attached to the device is not necessarily unique between different products and different manufacturers. Additionally, one individual may be registered in different tenants in duplicate because the one individual is transferred to another customer organization. Hence, in the present embodiment, upon receipt of a register request from the network device 110, a device ID is issued to the network device 110 to uniquely identify the network device 110 in the device management server 120. The issued device ID is recorded in a device identification information management table to be described below.

Upon receipt of data from the network device 110, the device identifying unit 313 receives a device ID from the network device 110. Subsequently, the device identifying unit 313 specifies the network device 110, which is the data transmission source, by using the received device ID.

Table B shows an example of the device identification information management table generated by the device identification information issuing unit 312.

TABLE B

| Device ID | Tenant ID | Serial Number. | Movement destination tenant ID |
|---|---|---|---|
| 11111111-1111-1111-1111-1111111111 | 10001 | DEV0001 | |
| 22222222-2222-2222-2222-2222222222 | 10001 | DEV0002 | 20001 |
| 33333333-3333-3333-3333-3333333333 | 10002 | DEV0002 | |

In Table B, the "Device ID" is ID information for uniquely identifying the network device 110 in the device management server 120.

The "Tenant ID" is ID information for specifying the tenant to which the network device 110 belongs. This tenant ID is specified by using a register key included in a register request that has been received from the network device 110.

The "Serial Number." is ID information for uniquely identifying the device in the tenant. Specifically, unlike the device ID, the serial number does not have to be unique in the overall device management server 120. However, since the tenant ID is unique in the overall device management server 120, the device can be uniquely identified in the overall device management server 120 by using the combination of the tenant ID and the serial number.

The "Movement destination tenant ID" is ID information that specifies the tenant after movement when the tenant in which the network device 110 is registered is moved to another tenant. The movement destination tenant ID is empty when the tenant movement is not requested. In contrast, upon request of the tenant movement from the client terminal 140, a tenant, which becomes a movement destination, is registered in a movement destination tenant ID column. Thereafter, when the communication with the network device 110 corresponding to this movement request has been established, the registration is changed such that the network device 110 is subordinate to the tenant corresponding to this movement destination tenant ID.

The device registration management unit 320 registers the network device 110 in the tenant, and logically separates and manages the network devices 110 in tenant units. This device registration management unit 320 includes a device registering unit 321 and a device registration destination change instruction receiving unit 322.

The device registering unit 321 receives the device identification information (see Table B) that has been issued by the device identification information issuing unit 312. Subsequently, the device registering unit 321 stores the information about the network device 110 in the device management server 120 in association with the tenant.

Table C shows an example of the device information table registered by the device registering unit 321.

TABLE C

| Tenant ID | Serial Number | Device Name | Registration Data |
| --- | --- | --- | --- |
| 10001 | DEV00001 | Device A | 2018 Dec. 1 10:00 |
| 10001 | DEV00002 | Device B | 2018 Dec. 8 10:00 |
| 10002 | DEV00002 | Device C | 2018 Dec. 15 10:00 |

As described above, the "Tenant ID" is ID information for specifying the tenant to which the network device 110 belongs. A plurality of network devices 110 can be registered in association with a single tenant ID.

As described above, the "Serial Number" is ID information for uniquely identifying the network device 110 in the tenant.

In addition, information such as a device name and a registration date and time is recorded in the device information table to serve as the network device information.

The device registration management unit 320 stores the information related to each of the network devices 110 in a state logically separated from each other for each tenant. Therefore, the user of the customer organization can refer only to the information about the network device 110 that belongs to the tenant corresponding to the user itself.

In contrast, the client terminal 140 of the sales organization can refer to the information about the network device 110 of the tenant of the customer organization managed by the sales organization or the tenant corresponding to a sales organization that is affiliated with the sales organization. As a result, the sales organization can provide the management service of the network device 110 to the customer organization.

A device registration destination change instruction receiving unit 322 receives a request that moves the tenant to which the network device 110 belongs from the client terminal 140 of the sales organization. Accordingly, the user of the sales organization can change the registration of the network device 110 that belongs to the tenant of the sales organization or belongs to the tenant of a sales organization that is affiliated with the sales organization such that the network device 110 belongs to another tenant.

Upon receipt of the request that changes the registration of the tenant, the device registration destination change instruction receiving unit 322 registers the movement destination tenant ID in the device identification information management table (see Table B) managed by the device identification information issuing unit 312.

Figure 4:
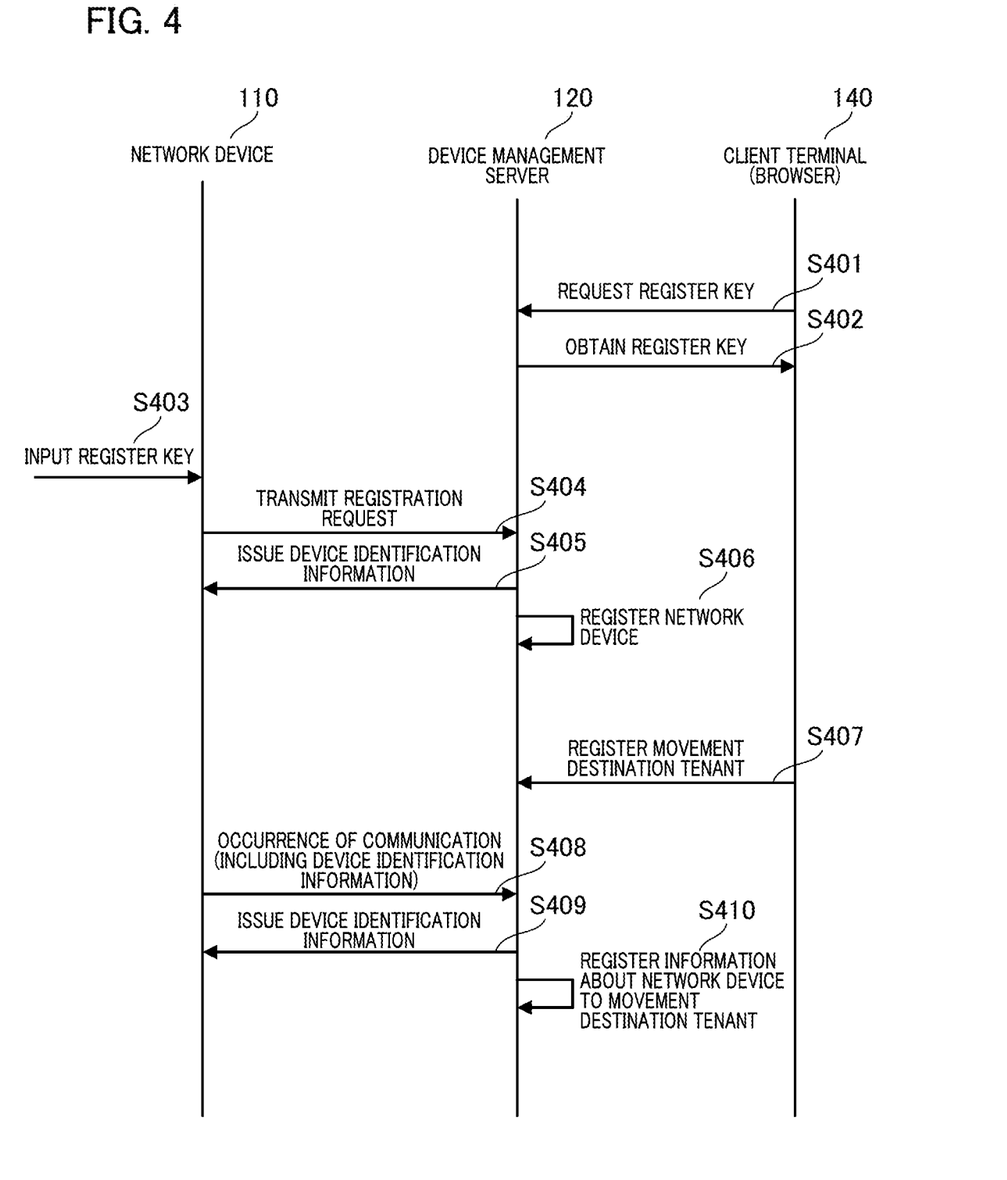
FIG. 4 is a sequence diagram illustrating a procedure for registering the network device in the device management server according to Embodiment 1.

FIG. 4 is a sequence diagram for explaining a series of procedures for registering the network device 110 in the device management server 120.

As described above, in many cases, the installation work and the registration work of the network device 110 are performed not by a customer organization but by, for example, a sales organization that has sold the network device 110 to the customer organization. Therefore, the procedure of the registration operation will be described by taking the case in which the sales organization performs the registration operation as an example.

As described above, in the conventional registration processing (see Japanese Unexamined Patent Application, First Publication No. 2014-81779 described above), the sales organization creates a tenant of the customer organization in the device management server 120 in advance before the installation work, and acquires the register key of the tenant.

After the network device 110 is installed at the installation site, the network device 110 is operated to input the register key that has been obtained in advance. As a result, the device management server 120 registers the network device 110 in the tenant specified by the register key.

In contrast, in the present embodiment, the network device 110 has been registered in the tenant of the sales organization in advance during installation work, and after the installation work, the process of changing the registration destination tenant from the sales organization to the customer organization is performed.

As shown in FIG. 4, in the registration processing of the present embodiment, an operator of the sales organization has operated the browser of the client terminal 140 to access the device management server 120 in advance before the installation work. Subsequently, the client terminal 140 requests the device management server 120 to create a tenant of the sales organization and to issue a register key that specifies the tenant (step S401 in FIG. 4).

In response to this request, the device management server 120 issues the register key and returns the register key to the client terminal 140 (step S402 in FIG. 4). Accordingly, the sales organization can obtain the register key of the sales organization itself in advance.

At the installation work site, the worker of the sales organization operates the register key input receiving unit 301 of the network device 110 to input the register key obtained in the above procedure 402 (step S403 in FIG. 4). The network device 110 transmits a registration request in which this register key has been stored to the device management server 120 (step S404 in FIG. 4).

Upon receipt of the registration request, the device management server 120 issues and returns the device identification information corresponding to the network device 110 (step S405 in FIG. 4). As described above, the device identification information is information that uniquely identifies the network device 110 in the device management server 120 (see Table B). The device identification information is issued by the device identification information issuing unit 312 and used for the authentication processing for the network device 110.

The device management server 120 performs the device registration processing together with the issuance processing of the device identification information (step S406 in FIG. 4). This device registration processing is performed by the device registering unit 321 as described above. In this device registration processing, the network device 110 is registered in the device management server 120 as a device belonging to the tenant of the sales organization.

Thereafter, the operator of the sales organization operates the browser of the client terminal 140 to access the device management server 120 and transmits an instruction to register the change of the registration destination tenant to the device registration destination change instruction receiving unit 322 (step S407 in FIG. 4).

Figure 5A:
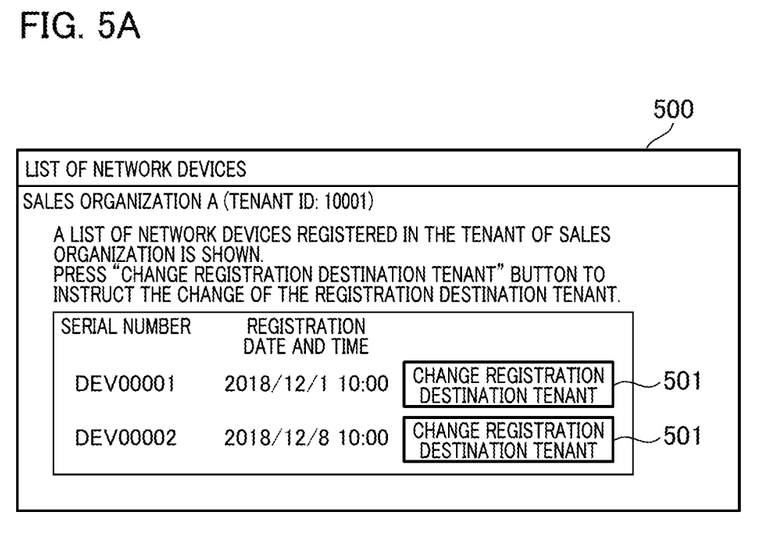
FIG. 5A and FIG. 5B are conceptual diagrams illustrating an operation screen of the client terminal in Embodiment 1.
Figure 5B:
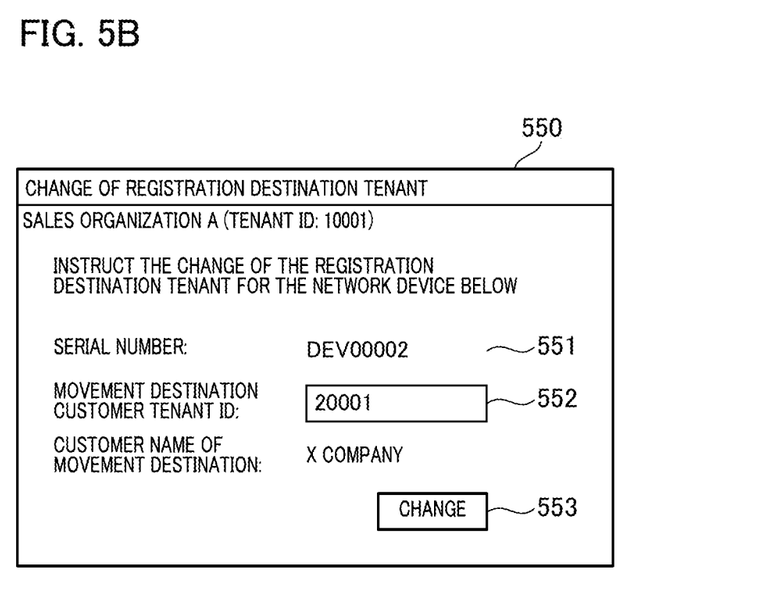

FIG. 5A and FIG. 5B are examples of screens displayed on the browser of the client terminal 140 when an instruction to change the registration destination tenant is transmitted to the device registration destination change instruction receiving unit 322.

FIG. 5A illustrates a screen 500 that displays a list of the network devices 110. On the screen 500, the serial numbers of the network devices 110 registered in the tenants of the sales organization are listed together with the registration date and time. In addition, a registration destination tenant change button 501 is displayed in the display column of each network device 110. Subsequently, the network device 110 that changes the registration destination tenant is selected by the pressing operation of the registration destination tenant change button, and a change screen 550 of FIG. 5B is displayed.

In the change screen 550 of FIG. 5B, a serial number display field 551 of the network device 110 and an input field 552 for specifying a new tenant are displayed.

The serial number display field 551 is a field that displays the serial number of the network device 110 that has been selected on the screen 500, in other words, the serial number display field 551 is a field that displays the serial number of the network device 110 that is the object of the registration change.

In the input field 552, the movement destination customer tenant ID is input by the operator of the sales organization. The movement destination customer tenant is a tenant to which the network device 110 newly belongs.

After inputting the movement destination customer tenant ID into the input field 552, the operator of the sales organization depresses a change button 553. Thus, a change registration instruction for changing the tenant to which the network device is registered is transmitted to the device registration destination change instruction receiving unit 322 of the device management server 120 from the browser of the client terminal 140.

The device registration destination change instruction receiving unit 322 of the device management server 120 receives this change registration instruction. As will be described below, the device registration destination change instruction receiving unit 322 does not perform the change registration processing immediately after receiving this change registration instruction, but performs the change registration processing when the device management server 120 is accessed from the network device 110 for the first time after receiving this change registration instruction.

The network device 110 performs communication for accessing the device management server 120 at a predetermined timing in order to transmit data such as the setting information and the operation information. As described above, upon access from the network device 110, the device connection management unit 310 of the device management server 120 performs the authentication processing. Therefore, the above device identification information is transmitted from the network device 110 to the device management server 120 (step S408 in FIG. 4). In this sequence, an example is described in which the device identification information issued in response to a tenant of the sales organization is used as the authentication information.

Upon receiving the device identification information, the device connection management unit 310 of the device management server 120 performs the authentication processing of the network device 110. In this authentication processing, the device connection management unit 310 causes the device identification information issuing unit 312 to reissue the device identification information. The reissued device identification information is transmitted from the device management server 120 to the network device 110 (step S409 in FIG. 4).

Subsequently, the device registration destination change instruction receiving unit 322 of the device management server 120 executes processing for changing the registration of a tenant in which the network device 110 belongs from the tenant of the sales organization to the tenant of the customer organization (step S410 in FIG. 4).

Figure 6:
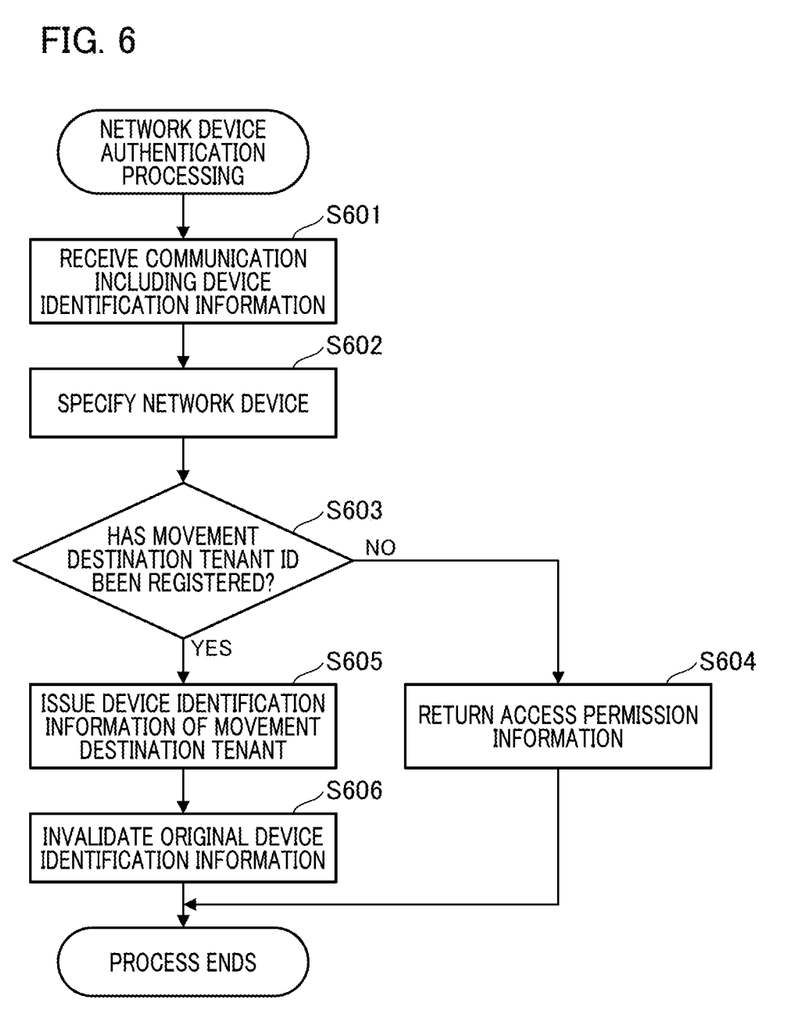
FIG. 6 is a general flowchart for explaining the registration change processing of the network device according to Embodiment 1.

FIG. 6 is a flowchart for explaining the tenant change registration processing performed by the device connection management unit 310 of the device management server 120 in more detail. The process of FIG. 6 corresponds to steps 408 to 410 in FIG. 4. The tenant change registration processing will be described below with reference to the flowchart of FIG. 6.

As described above, the authentication program that executes this flowchart is stored in the storage device 203 of the device management server 120, read into the memory 204, and executed by the CPU 205.

During reception of the setting information and the operation information and the like from the network device 110, the device management server 120 performs authentication processing that uses the device identification information issued to the network device 110.

In this authentication processing, first, the device identifying unit 313 of the device connection management unit 310 receives the authentication information including the device identification information (step 601 in FIG. 6). Subsequently, the device identifying unit 313 specifies the network device 110 to be authenticated by using this device identification information (step S602).

Next, the device identifying unit 313 determines whether or not the movement destination tenant ID of the specified network device 110 has been registered by using the device identification information management table (see Table B) managed by the device identification information issuing unit 312 (step S603).

In step S603, if the movement destination customer tenant ID has not been registered, the device connection management unit 310 returns access permission information, which is corresponding to the device and the tenant specified by the device identification information, to the network device 110 (step S604). As a result, the network device 110 cannot receive the management service of the device management server 120.

In contrast, if the movement destination customer tenant ID is registered in step S603, the device identifying unit 313 instructs the device identification issuing unit 312 to issue the device identification information corresponding to the movement destination tenant ID. In accordance with this instruction, the device identification information issuing unit 312 issues the device identification information corresponding to the movement destination tenant ID and transmits the device identification information to the network device 110 (step S605). Further, the device identification information issuing unit 312 invalidates the device identification information that has been issued corresponding to the tenant of the sales organization (step S606).

As described above, in the present embodiment, the network device 110 is temporarily registered as a device that belongs to a tenant of the sales organization. When the device registration destination change instruction receiving unit 322 receives an instruction to change the registration destination tenant, the movement destination tenant ID is registered in the device identification information management table. Subsequently, the new device identification information is issued in step S605 and the original device identification information is invalidated in step S606.

As described in detail above, in the present embodiment, the network device 110 is temporarily registered as a device that belongs to the tenant of the sales organization, and then the device management server 120 instructs the network device 110 to change the registration destination tenant. Accordingly, it is possible to change the registration of the device that belongs to the tenant of the sales organization such that the device belongs to the tenant of the customer organization. Hence, during the first registration, the operation on the network device 110 side is only the operation of inputting the register key corresponding to the tenant of the sales organization. Therefore, in the present embodiment, the sales organization that performs the installation work of the network device 110 does not have to obtain the registration code of the customer organization in advance. As a result, in the present embodiment, it is possible to eliminate even the need to create a tenant of the customer organization in advance before the installation work. Therefore, according to the present embodiment, the work load on the sales organization in the installation work can be reduced.

Embodiment 2

As described above, in Embodiment 1, the network device 110 is temporally registered in the tenant of the sales organization to serve as a device that belongs to the tenant of the sales organization. Subsequently, the device management server 120 instructs the network device 110 to change the registration so as to belong to the tenant of the customer organization. Accordingly, although the operation in the network device 110 can be performed only by inputting the register key corresponding to the tenant of the sales organization, the process of registering the network device 110 so as to belong to the tenant of the customer organization cannot be performed until the tenant of the sales organization is temporally registered. As a result, even if a tenant has been created in advance and assigned to the customer organization, the network device 110 cannot be registered in the tenant of the customer organization unless the network device has temporally been registered in the tenant of the sales organization.

In contrast, in the present embodiment, the tenant of the customer organization can be registered in the device management server 120 in advance. If the tenant of the customer organization has been registered in advance, the registration of the network device 110 is automatically changed from the tenant of the sales organization to the tenant of the customer organization when registering the network device 110 in the device management server 120 for the first time.

The system configuration and hardware configuration according to the present embodiment are the same as those in the Embodiment 1 described above (see FIG. 1 and FIG. 2).

Additionally, the software configuration according to the present embodiment is substantially the same as that of Embodiment 1 described above (see FIG. 3). However, the device registration destination change instruction receiving unit 322 differs from that of the above-described Embodiment 1 in that it includes a function for receiving an instruction to change the tenant of the unregistered network device 110 in addition to a function for changing the tenant of the registered network device 110.

In the present embodiment, the operator of the sales organization can perform an advance instruction that changes the network device 110 to be registered as a device that belongs to a certain tenant to a device that belongs to another tenant after the registration (hereinafter, refereed to as a "registration change advance instruction"). The tenant in the first registration of the network device 110 is, for example, a tenant of a customer organization managed by the sales organization, or a tenant corresponding to an organization that is affiliated with the organization of the sales organization.

In the registration change advance instruction, a tenant ID that specifies a tenant to be registered first, a serial number that specifies the network device 110 to be an object, and a tenant ID that specifies the tenant after the registration change are used (see FIG. 8 to be described below). Upon receiving the registration change advance instruction, the device registration destination change instruction receiving unit 322 instructs the device identification information issuing unit 312 to issue the device identification information. Subsequently, the device registration destination change instruction receiving unit 322 registers the tenant ID of the tenant after the registration change in the device identification information management table managed by the device identification information issuing unit 312 (see Table B).

Figure 7:
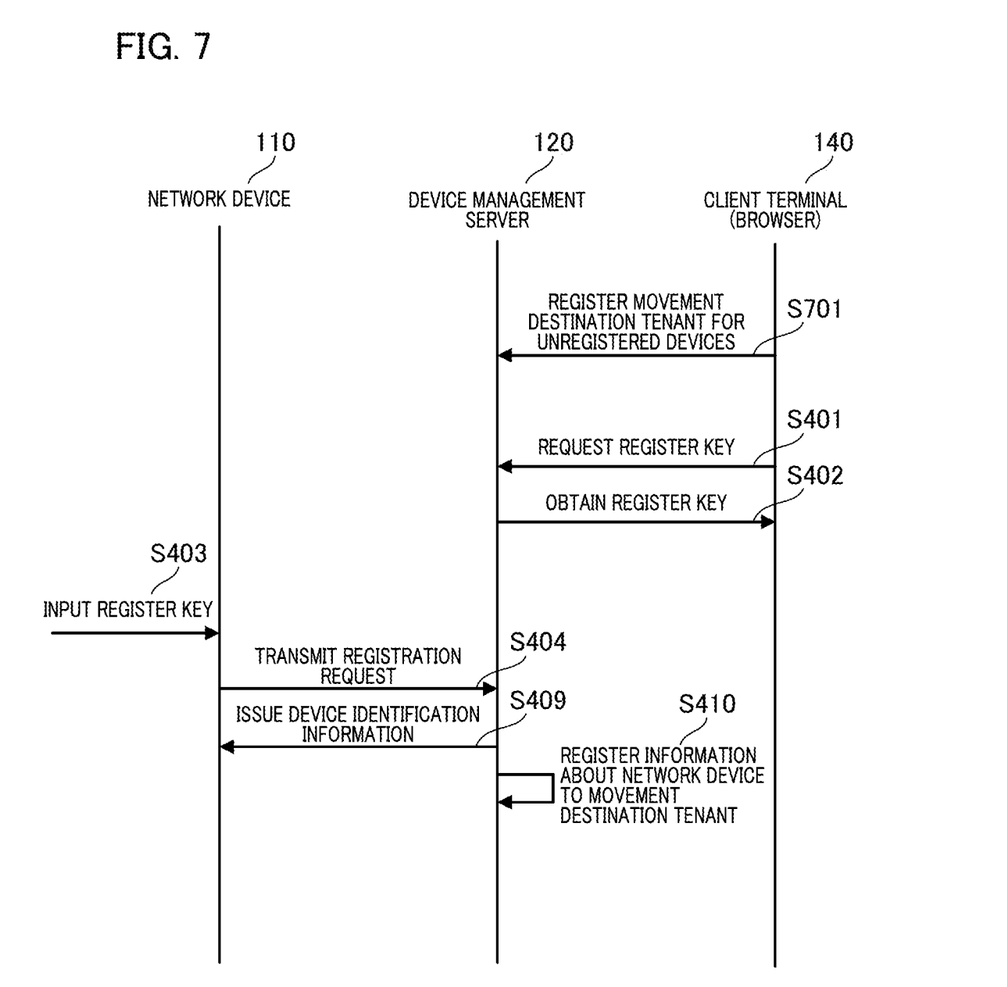
FIG. 7 is a sequence diagram illustrating a procedure for registering the network device in the device management server according to Embodiment 2.

FIG. 7 is a sequence diagram for explaining a series of procedures in registering the network device 110 in the device management server 120 in the present embodiment.

In the present embodiment, first, the browser of the client terminal 140 accesses the device management server 120 by the operation of the operator of the sales organization. Subsequently, the browser of the client terminal 140 registers the registration change advance instruction (step S701 in FIG. 7).

Figure 8:
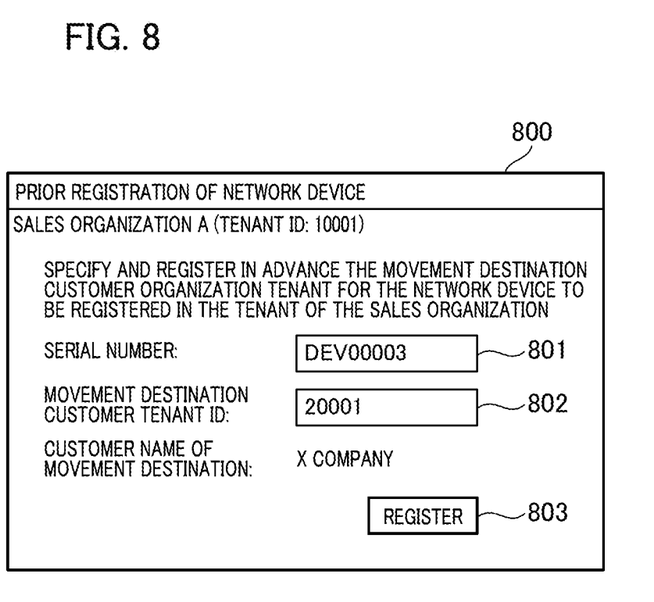
FIG. 8 is a conceptual diagram illustrating an operation screen of a client terminal in Embodiment 2.

FIG. 8 shows an example of a screen displayed on the browser of the client terminal 140 during the transmission of the registration change prior instruction to the device registration destination change instruction receiving unit 322. By using a screen 800 of FIG. 8, the network device 110 that is an object of the registration change is specified and the tenant to which the network device 110 will belong after the registration change is specified.

In the screen 800 of FIG. 8, a serial number that specifies the network device 110 to be an object of the registration change advance instruction is input to a serial number input field 801. The serial number is a number that has been determined to be unique in at least the identical tenant.

The tenant ID that specifies the tenant to which the network device 110 belongs after the registration change is input into a movement destination customer tenant ID input field 802.

By depressing a registration button 803 after the input operation to the input fields 801 and 802, the registration change advance instruction is transmitted from the browser of the client terminal 140 to the device registration destination change instruction receiving unit 322. At this time, the device management server 120 internally registers the serial number that has been inputted in the input field 801, the device identification information that has been issued in association with the serial number, and the tenant ID of the movement destination that has been input in the input field 802 in the tenant of the sales organization A (tenant ID: 10001) shown in FIG. 8.

The subsequent procedures are the same as those in FIG. 4 having the same reference numerals.

That is, first, the browser of the client terminal 140 accesses the device management server 120 by the operation of the operator of the sales organization and requests the register key (step S401 in FIG. 7). Thus, the sales organization acquires the register key in advance (step S402 in FIG. 7). As in Embodiment 1 described above, this register key specifies the tenant of the sales organization.

Subsequently, in the installation work of the network device 110, the installation worker of the sales organization or the like inputs the register key corresponding to the tenant of the sales organization acquired in step S402 from the register key input receiving unit 301 of the network device 110 (step S403 in FIG. 7). Then, a registration request to the tenant of the sales organization is transmitted from the network device 110 to the device management server 120 (step S404 in FIG. 7).

Upon receiving the registration request, the device connection management unit 310 of the device management server 120 issues and returns the device identification information corresponding to the network device 110 in accordance with the registration change prior instruction described above (step S409 in FIG. 7). The issued device identification information is not the device information corresponding to the tenant of the sales organization, but the device information corresponding to the tenant of the customer organization to which this network device 110 is to be registered, and this issuance processing corresponds to the "reissue" of the above-described Embodiment 1.

Subsequently, the device registration destination change instruction receiving unit 322 of the device management server 120 executes a process of registering the network device 110 to serve as a device that belongs to the tenant of the customer organization (step S410 in FIG. 7).

Figure 9:
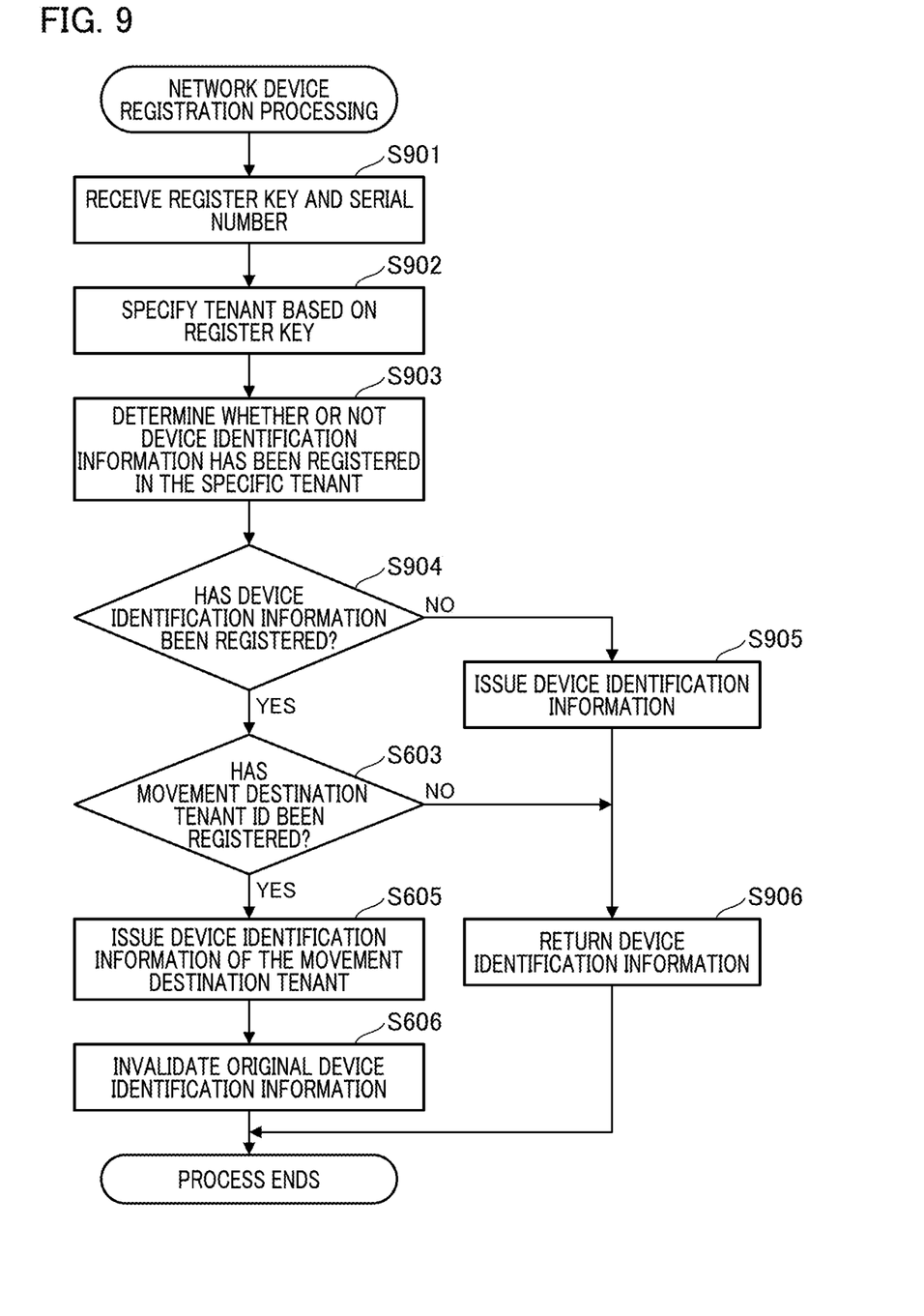
FIG. 9 is a general flowchart for explaining the procedure for the registration change of the network device in Embodiment 2.

FIG. 9 is a flowchart for explaining the tenant change registration processing performed by the device connection management unit 310 of the device management server 120 in more detail. The process of FIG. 9 corresponds to steps S404, S409, and S410 of FIG. 7. The tenant registration processing will be described below with reference to the flowchart of FIG. 9.

Note that, as described above, the authentication program that executes this flowchart is stored in the storage device 203 of the device management server 120, read into the memory 204, and executed by the CPU 205.

The device management server 120 receives a registration request from the network device 110. This registration request includes the serial number that specifies the network device 110 to be an object, in addition to the register key (see, for example, step S701 of FIG. 7, and FIG. 8).

The device connection management unit 310 of the device management server 120 specifies the tenant based on the received register key (step S902). Specifically, the tenant of the sales organization A (tenant ID: 10001) shown in FIG. 8 is specified.

Subsequently, the device connection management unit 310 determines whether or not the network device 110 has been registered in the device identification information (see Table B) to serve as a device belonging to the tenant (step S903). At this time, the serial number included in the registration request is used for specifying the network device 110.

As a result for the determination in step S903, if it is determined that the network device 110 has not been registered ("NO" in step S904), the device identification information issuing unit 312 issues the device identification information to the network device 110 (step S905). Subsequently, the process of step S906 (to be described below) is performed.

In contrast, as a result for the determination in step S903, if it is determined that the network device 110 has been registered ("YES" in step S904), the device identifying unit 313 determines whether or not the movement destination tenant ID has been registered in the device identification information (step S603).

If the movement destination customer tenant ID has not been registered in step S603, the process of step S906 is performed.

In step S906, the device connection management unit 310 returns the device identification information to the network device 110.

If the process proceeds from step S905 to step S906, the device identification information issued in step 905 is returned. Specifically, the process in this case corresponds to the process in step S405 (see FIG. 4) of the above Embodiment 1, and after this process, the registration of the information of the network device 110 in the tenant of the sales organization described in step S405 is performed.

Additionally, the case in which the process proceeds from step S603 to step S906 is a case where the registration request to the tenant of the sales organization is executed due to the erroneous input of the register key after the first time from the network device 110. Also in such a case, the device identification information that has already been issued is returned because the case is assumed in which the device identification information that has been already returned has been initialized on the network device 110 side.

In contrast, if the destination customer tenant ID is determined to have been registered in step S603, the device identifying unit 313 instructs the device identification information issuing unit 312 to issue the device identification information corresponding to the movement destination tenant ID. In accordance with this instruction, the device identification information issuing unit 312 issues the device identification information corresponding to the movement destination tenant ID, and transmits the device identification information to the network device 110 (step S605). Furthermore, the device identification information issuing unit 312 invalidates the device identification information that has been issued corresponding to the tenant of the sales organization (step S606).

As described in detail above, according to the present embodiment, in the case in which the tenant of the customer organization has been created in advance, the change of the registration of the network device 110 from the tenant of the sales organization to the tenant of the customer organization is automatically performed after registering the network device 110. At this time, because the only operation required for the network device 110 is to input the register key of the tenant of the sales organization, the load on the sales organization in the installation work can be reduced.

Additionally, even if the prior registration of the tenant after the registration change cannot be performed in the device management server 120, it is possible to change the registration destination of the network device 110 to the tenant of the customer organization after temporarily registering the network device 110 in the tenant of the sales organization, in a manner similar to Embodiment 1 described above.

As described above, according to the present embodiment, the load on the sales organization in the installation work can be reduced both in the cases in which the prior registration in the device management server 120 is possible, and in which the prior registration in the device management server 120 is impossible.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-234203 filed Dec. 14, 2018, which is hereby incorporated by reference herein in its entirety.

What is claimed is:

1. A device management system including a device management service that classifies and manages network devices for each tenant, comprising:
   a memory storing instructions; and
   a processor executing the instructions causing the device management system to:
   issue a register key that specifies a worker tenant;
   receive a registration request including the register key from the network device;
   transmit first authentication information issued for use in communication with the device management system to the network device, which is a transmission source of the registration request;
   register information about the network device, which is the transmission source of the registration request, in the worker tenant that is specified by the register key included in the registration request, in a case where, before receiving the registration request, a different tenant used to manage the information about the network device has not been created;
   automatically re-register, if there has been communication that uses the first authentication information from the network device after the different tenant, which is the transmission source of the registration request is created, the information about the network device that has been registered in the worker tenant in the different tenant; and
   register the information about the network device in the different tenant in response to the receipt of the registration request including the register key from the network device, in a case where, before receiving the registration request, the different tenant has been created and an instruction to register the information about the network device in the different tenant has been received.

2. The device management system according to claim 1, wherein the instructions stored in the memory further cause the device management system to:
   return access permission information in accordance with the information about the network device that has been registered in the worker tenant if there has been communication that uses the first authentication information from the network device before the different tenant for managing the information about the network device, which is the transmission source of the registration request, is created.

3. The device management system according to claim 1, wherein the instructions stored in the memory further cause the device management system to:
   transmit second authentication information that is reissued for use in communication with the device management system to the network device if there has been communication that uses the first authentication information from the network device after the different tenant is created.

4. The device management system according to claim 3, wherein the instructions stored in the memory further cause the device management system to:
   invalidate the first authentication information if the second authentication information has been reissued.

5. The device management system according to claim 3, wherein the second authentication information includes device identification information used to manage the network device in the different tenant.

6. The device management system according to claim 1, wherein the first authentication information includes device identification information used to manage the network device in the worker tenant.

7. The device management system according to claim 1, wherein the instructions stored in the memory further cause the device management system to:
   provide an instruction screen to provide an instruction to re-register the information about the network device registered in the worker tenant in the different tenant upon creation of the different tenant.

8. A method for a device management service that classifies and manages network devices for each tenant, the method comprising:
   issuing a register key that specifies a worker tenant;
   receiving a registration request including the register key from the network device;
   transmitting first authentication information issued for use in communication with the device management system to the network device, which is a transmission source of the registration request;
   registering information about the network device, which is the transmission source of the registration request in the worker tenant that is specified by the register key included in the registration request, in a case where, before receiving the registration request, a different tenant used to manage the information about the network device has not been created;
   automatically re-registering, if there has been communication that uses the first authentication information from the network device after the different tenant, which is the transmission source of the registration request is created, the information about the network device that has been registered in the worker tenant in the different tenant; and
   registering the information about the network device in the different tenant in response to the receipt of the registration request including the register key from the network device, in a case where, before receiving the registration request, the different tenant has been created and an instruction to register the information about the network device in the different tenant has been received.

* * * * *